UNITED STATES PATENT OFFICE.

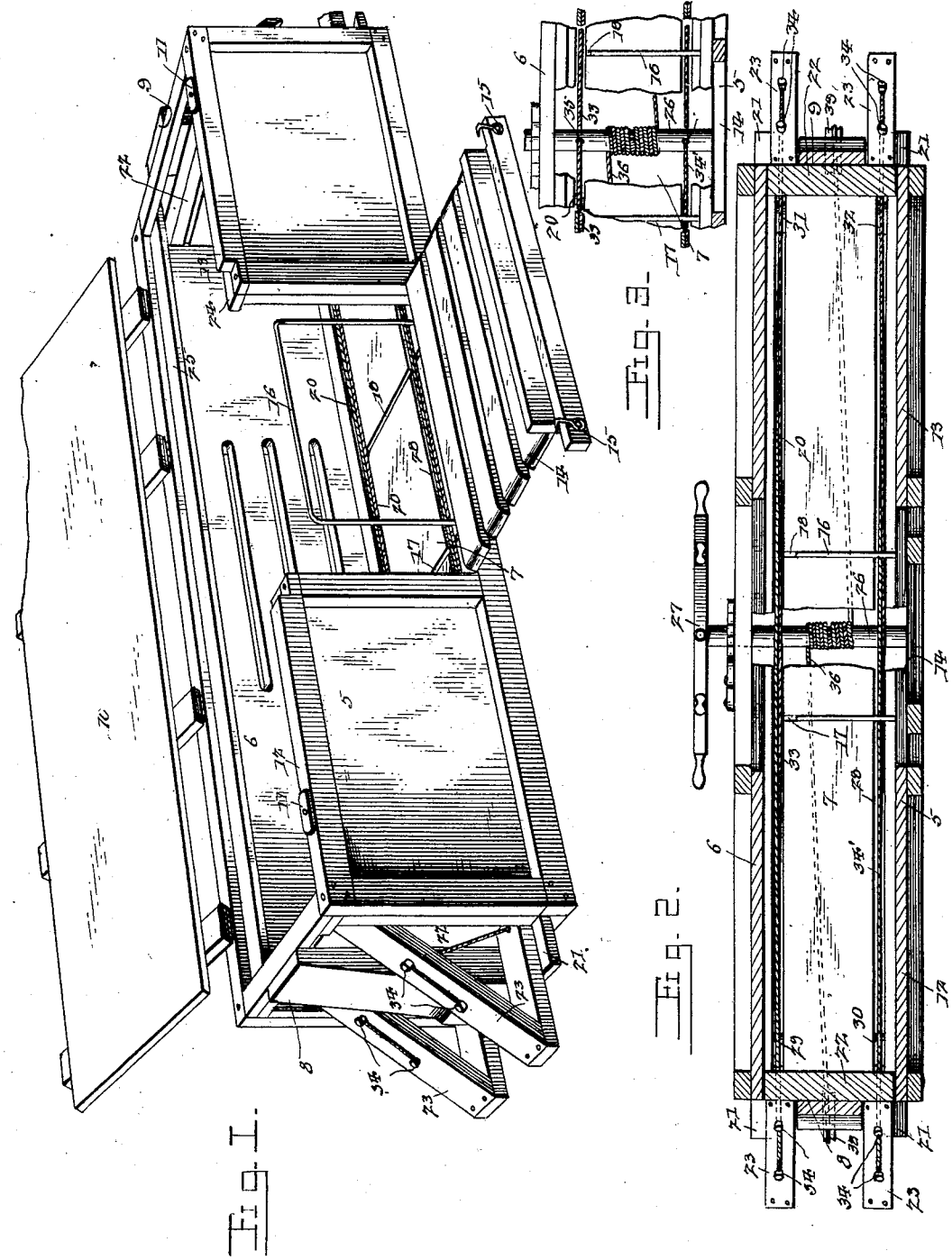

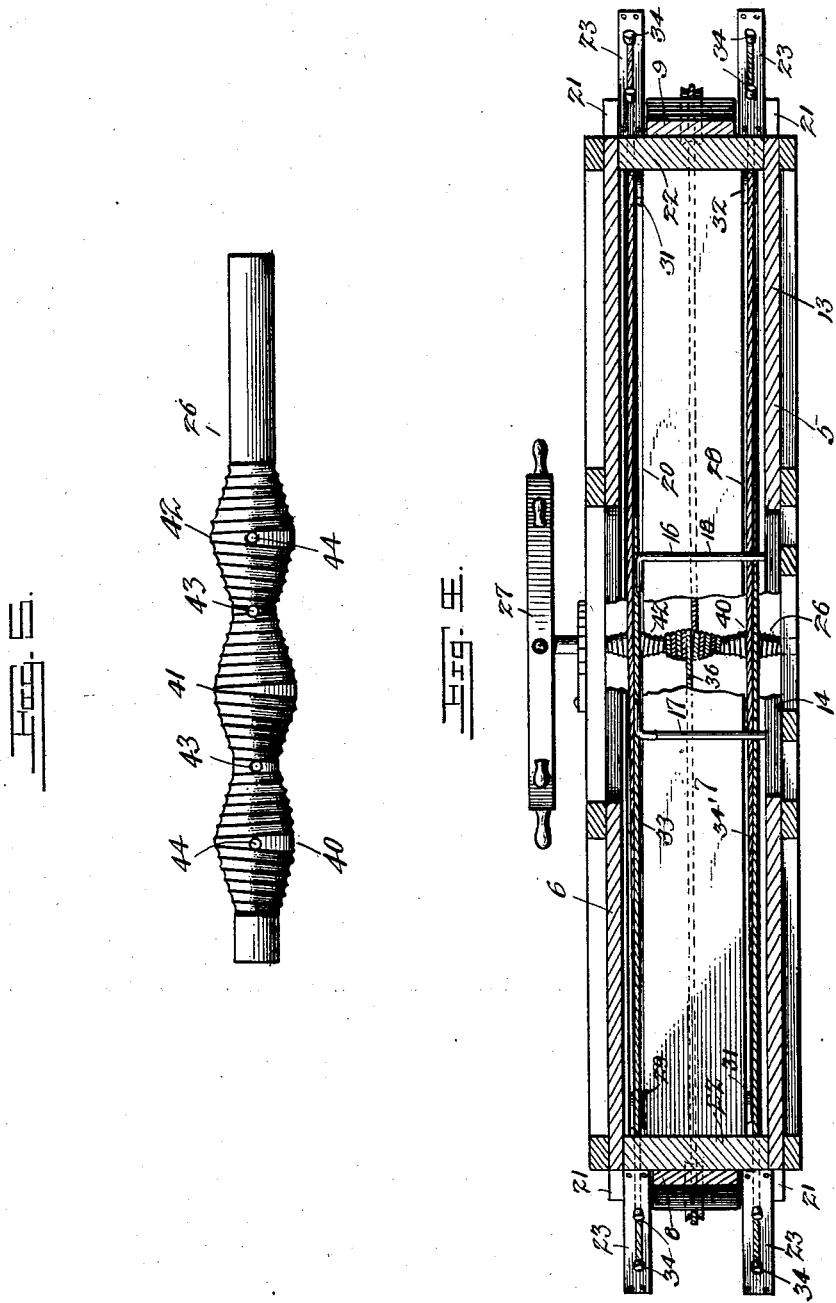

TRUEMAN CROSS WEST, OF HATTIESBURG, MISSISSIPPI.

BALING-PRESS.

SPECIFICATION forming part of Letters Patent No. 703,688, dated July 1, 1902.

Application filed July 23, 1901. Serial No. 69,424. (No model.)

*To all whom it may concern:*

Be it known that I, TRUEMAN CROSS WEST, a citizen of the United States, residing at Hattiesburg, in the county of Perry and State of Mississippi, have invented a new and useful Baling-Press, of which the following is a specification.

This invention relates to baling-presses in general and more particularly to that class used in the baling of hay, straw, and similar substances, the object of the invention being to provide a construction wherein two plungers will be operated to simultaneously operate upon opposite ends of a bale to compress it and wherein the completed bale may be readily discharged and the press made ready to receive a second charge.

A further object of the invention is to provide a simple and efficient means for actuating the plungers, additional objects and advantages of the invention being evident from the following description.

In the drawings forming a portion of this specification, and in which like numerals of reference indicate similar parts in the several views, Figure 1 is a perspective view showing the press with the parts in the positions assumed just after the bale is discharged. Fig. 2 is a longitudinal section of the machine, taken in a horizontal plane and showing the arrangement of the ropes which operate the plungers. Fig. 3 is a detail view similar to Fig. 2 and showing the upper ropes removed to disclose the arrangement of the lower ropes. Fig. 4 is a view similar to Fig. 2, showing a modified form of winding-drum. Fig. 5 is a detached detail view of the winding-drum shown in Fig. 4.

Referring now to the drawings, the press includes a press-box comprising sides 5 and 6, a bottom 7, ends 8 and 9, and a hinged top or cover 10, which latter is adapted to fold down into the upper portion of the box to lie flush with the upper edges of the sides and ends thereof, and it is adapted to be held in its closed position by means of suitable latches which may be in the form of turn-buttons 11.

What may be termed the "front" side 5 of the press-box includes rigid end sections 12 and 13 and an intermediate section 14, which is in the form of a gate comprising slats and uprights, the lower edge of this gate being hinged to the bottom of the box in position to be folded or closed to lie in the opening between the sections 12 and 13 and in the plane thereof or for movement outwardly to lie parallel with the bottom of the box. Hooks 15 are pivoted to the upper edge of the gate and are adapted for engagement with the inner faces of the sections 12 and 13 to hold the gate against outward movement.

Secured to the inner face of the gate 14 and adjacent to the hinged lower edge thereof is a rectangular frame 16, which projects at right angles to the gate, and when the gate is in its erect or closed position this frame 16 lies with its side portions in transverse grooves 17 and 18 in the upper face of the bottom 7 of the press-box and with the web 19 of the frame projecting into the longitudinal slot 20, which is formed vertically through the bottom 7 of the press-box adjacent to the rear side 6 thereof for a purpose which will be presently explained.

The ends 8 and 9 of the press-box do not entirely close the box at these portions, but instead are in the form of uprights or stanchions, and at each side thereof there is an opening, as shown, through which project the sills 21, upon which the plunger-heads 22 are mounted in vertical positions, and from the outer ends of the sills lead braces 23 to the upper edges of the plunger-heads. Beads 24 and 25 are formed upon the inner faces of the sides of the press-box and at the upper edges thereof, and these beads lie upon the upper edges of the plungers and prevent upward displacement thereof.

To move the plungers simultaneously toward each other and then away from each other, a winding-drum 26 is mounted beneath the press-box in suitable bearings, this drum having a hand-wheel 27, through the medium of which it may be oscillated, although it will be understood that said drum may be operated in any other suitable manner.

The slot 20, as above mentioned, is formed longitudinally through the bottom of the press-box and adjacent to the rear side thereof, and a second slot 28 is formed longitudinally of the bottom of the press-box adjacent to the front side 5, and at the ends of these slots are rotatably-disposed rollers or pulleys 29, 30, 31, and 32, which rotate in vertical planes.

Two operating-cables 33 and 34 are employed. One of these cables 33 is passed through a perforation 35 adjacent to the rear end of the drum and in line with the slot 20. One end of this cable is taken along the slot and over the pulley 29 and then in the opposite direction across the drum and through an upwardly-directed perforation at the inner end of a sill of the plunger-head at one end of the press-box. It is then taken upwardly through a brace 23 above said sill, and is then returned and taken through a second perforation in said brace, the cable being held against removal from the perforations in the brace by means of plugs 34. The opposite end of this cable is taken over the pulley 31 and then back and is engaged with the opposite plunger in the same manner as above described in connection with the first end of the cable. The second operating-cable 34' is engaged with a perforation near the front end of the winding-drum, its ends being taken in opposite directions and upwardly around the pulleys 30 and 32 and are then returned and crossed, and the extremities are connected with the corresponding sills and braces of the plungers in the manner described. Thus it will be seen that if the winding-drum be rotated in one direction the bights of both cables will be wound thereon to move the plungers toward each other. A return-cable 36 is also employed, and this cable is passed through a perforation midway of the ends of the drum, the ends thereof being taken in opposite directions beneath the press-box and upwardly over pulley-wheels 38 and 39, which are mounted at the lower ends of the stanchions 8 and 9, and are then taken forwardly and attached to the plunger-heads. The cable 36 is wound upon the winding-drum, and when the cables 33 and 34 are wound upon the drum to move the plunger-heads toward each other the cable 36 unwinds, and when the drum is rotated in the opposite direction the cable 36 is wound up and cables 33 and 34 unwind, the plungers being then drawn to the ends of the press-box.

Instead of employing a plain cylindrical winding-drum such as shown in Figs. 2 and 3 the form of winding-drum shown in Figs. 4 and 5 may be used, this drum being constructed in such manner as to cause the plungers initially to have rapid movement toward each other with comparatively small power and gradually to decrease in speed with increased power. To effect this, the drum is constructed with three double-cone-shaped winding-spools 40 41 42, the spools 40 and 42 to be engaged by the plunger-operating cables 33 and 34, and the spool 41 to be engaged by the plunger-returning cable 36. In order to cause proper coöperation between the cables—that is to say, to cause the plunger-returning cable 36 to be payed out at the same rate of speed that the plunger-operating cables are taken up—the plunger-returning cable is divided at its center and the ends are passed in opposite directions through openings 43 at the small part of the drum between the winding-spools 40 and 42, while the plunger-operating cables are passed through openings 44 on the large part of the said spools. Each of the spools is provided with oppositely-disposed grooves or threads 45, which operate in a manner that will be readily understood to cause the cables properly to be wound upon and be held in position on the respective spools. The winding-drum above described will without the output of a greater amount of power than that necessary to operate the cylindrical drum shown in Figs. 2 and 3 effect more rapid operation of the machine with a highly-increased compressive power, so that an operator may in a given time effect more and better baling of hay than with the form of drum shown in Figs. 2 and 3.

In practice the gate is raised and secured in its erect position to close the front side of the press-box and the hay or other material to be pressed is placed in the box. The drum is then rotated in the manner above described to move the plungers toward each other and the bale is formed, the tie-wires being passed through the openings between the slats forming the gate and through the slots of the rear side 6 of the box, said wires also passing through the usual grooves in the plunger-heads. After the ties are in place the gate is unlatched and is swung downwardly into the position shown in Fig. 1, the frame 16 thereon acting to raise the bale and discharge it from the box onto the gate, from which it may be removed, and the gate may be returned for the machine to be operated to form another bale.

It will be understood that in practice various modifications of the specific construction shown may be made and that any suitable materials and proportions may be used for the various parts without departing from the spirit of the invention.

What is claimed is—

1. A baling-press comprising a box having plungers disposed for movement toward each other, a discharge-opening in the side of the box, a gate for said opening, a frame carried by the gate to lie against the bottom of the box when the gate is closed to receive the bale, said frame being movable with the gate when opened to discharge the bale, and means for operating the plungers.

2. A baling-press comprising a box having plungers disposed therein for operative movement toward the center of the box, a discharge-opening in the side of the box, a gate for said opening, a frame carried by the gate to receive the bale and movable with the gate to discharge the bale, a cover for the box, and means for operating the plungers.

3. A press comprising a box having plungers slidably mounted therein, a discharge-opening for the box, a slotted gate for the opening, a frame carried by the gate to lie against the bottom of the box when the gate is in closed position, and to discharge the bale when the gate is opened, plungers mounted at the ends of the box for movement toward the gate, the box having slots alining with the slots of the gate when the latter is in closed position, and means for moving the plungers simultaneously.

4. A baling-press comprising a box, a plunger slidably mounted at each end of the box for operative movement toward each other, said plungers comprising sills, heads at the inner ends of the sills, and braces from the sills to the heads, and cables engaged with the braces through perforations in and having means for winding them to operate the plunger.

5. A baling-press comprising a box having plungers mounted in its ends for operative movement toward each other, a discharge-opening midway of the ends of the box, a hinged gate for said opening provided with a frame disposed to receive and discharge the bale, a drum mounted upon the box, pulleys at the ends of the box, cables engaged with the drum and having their ends taken around the corresponding pulleys and then crossed and attached to the plungers for moving the latter in one direction, additional pulleys mounted in the box, and an additional cable engaged with the drum and having its ends taken around the last-named pulleys and attached to the plungers without crossing, to move the plungers in the opposite direction.

6. A baling-press comprising a box having plungers mounted in its ends for operative movement toward each other, a cable-operating drum mounted upon the box midway of its length and provided with three double-cone-shaped oppositely-grooved winding-spools, pulleys at each end of the box, plunger-operating cables secured to the intermediate portions of the two end spools and having their ends taken around corresponding pulleys and then crossed and attached to the plungers for moving the latter in one direction, pulleys mounted in the end of the box intermediate of its width, and a divided plunger-returning cable having two of its ends secured to the extremities of the intermediate spool and its other two ends passed around the last-named pulleys and attached to the plungers without crossing, to move the plungers in the opposite direction, substantially as and for the purpose specified.

In testimony that I claim the foregoing as my own I have hereto affixed my signature in the presence of two witnesses.

TRUEMAN CROSS WEST.

Witnesses:
W. H. COOK,
W. P. CHAMBERS.